(12) United States Patent
Inoue

(10) Patent No.: US 7,669,277 B2
(45) Date of Patent: Mar. 2, 2010

(54) CONNECTOR FOR SECURING WIPER BLADE TO WIPER ARM AND WIPER BLADE ASSEMBLY

(75) Inventor: Yuusuke Inoue, Kazo (JP)

(73) Assignee: Nippon Wiper Blade Co., Ltd., Saitama (JP)

( * ) Notice: Subject to any disclaimer, the term of this patent is extended or adjusted under 35 U.S.C. 154(b) by 1148 days.

(21) Appl. No.: 10/529,879

(22) PCT Filed: Oct. 2, 2003

(86) PCT No.: PCT/JP03/12661

§ 371 (c)(1),
(2), (4) Date: Apr. 1, 2005

(87) PCT Pub. No.: WO2004/031007

PCT Pub. Date: Apr. 15, 2004

(65) Prior Publication Data

US 2006/0053578 A1    Mar. 16, 2006

(30) Foreign Application Priority Data

Oct. 4, 2002    (JP) .............................. 2002-292124

(51) Int. Cl.
*B60S 1/40*    (2006.01)
(52) U.S. Cl. .................................................. 15/250.32
(58) Field of Classification Search .............. 15/250.32, 15/250.351, 250.43, 250.44, 250.31
See application file for complete search history.

(56) References Cited

U.S. PATENT DOCUMENTS 4,670,934 A * 6/1987 Epple et al. .............. 15/250.32
5,145,274 A   9/1992 Schon
5,289,608 A * 3/1994 Kim ........................ 15/250.32

(Continued)

FOREIGN PATENT DOCUMENTS

DE    33 31 310    3/1985

(Continued)

OTHER PUBLICATIONS

Japanese Official Action (in English language) issued Aug. 30, 2007.

*Primary Examiner*—Gary K Graham
(74) *Attorney, Agent, or Firm*—Wenderoth, Lind & Ponack, L.L.P.

(57) ABSTRACT

A connector (20) for securing a wiper blade to a wiper arm includes a base member (21) including a forward upper portion (32) and a rearward upper portion (33); a locking member (22) for holding either a U-hook portion (12) or a side pin (11) mounted to the base member (21); and a flexible connecting member (23) connecting the locking member (22) to the base member (21). To attach the connector (20) to the side pin (11), the connector is rotated toward the side pin (11) from the opposite side of the side pin (11) so that the side pin (11) fits into a recess (33A) of the rearward upper portion (33). The side pin (11) also fits into the recesses (47 and 48) of the locking member (22) so that the side pin (11) is held between the base member (21) and the locking member (22). The connector enables the firm securing of the wiper blade to the wiper arm so as to restrict vibrations between the wiper blade and the wiper arm.

10 Claims, 14 Drawing Sheets

U.S. PATENT DOCUMENTS

| | | |
|---|---|---|
| 5,611,103 A | 3/1997 | Lee |
| 5,920,950 A | 7/1999 | Young, III et al. |
| 6,000,093 A | 12/1999 | Charng |
| 6,263,538 B1 * | 7/2001 | Westermann et al. .... 15/250.32 |

FOREIGN PATENT DOCUMENTS

| | | | |
|---|---|---|---|
| DE | 3416505 | * | 11/1985 |
| FR | 2600292 | * | 12/1987 |
| GB | 1 569 374 | | 6/1980 |
| GB | 2156666 | * | 10/1985 |
| GB | 2 348 118 | | 9/2000 |
| JP | 62-5817 | | 2/1987 |
| JP | 62-137250 | | 6/1987 |
| JP | 10-203315 | | 8/1998 |
| WO | 00/48877 | | 8/2000 |

* cited by examiner

CONNECTOR FOR SECURING WIPER BLADE TO WIPER ARM AND WIPER BLADE ASSEMBLY

TECHNICAL FIELD

The present invention relates to a connector used in a wiper device for securing a wiper blade to a wiper arm.

BACKGROUND ART

A wiper device is generally comprised of a wiper blade, a wiper arm and a driving motor. The wiper blade includes a wiper rubber which wipes a surface to be wiped, such as an automobile windshield. The wiper blade is connected with the wiper arm which is associated with a driving motor, for example, through a linking member. The driving motor drives the wiper blade through the wiper arm so that the wiper rubber wipes the surface.

FIG. 12(C) shows a wiper arm 10' used in a wiper device. The wiper arm 10' includes a U-shaped tip portion (U-hook portion 12) which is designed to be connected with the wiper blade via a connector (hook-type securing).

FIGS. 12 (A) and (B) show a wiper arm 10 of a different type of securing. The wiper arm 10 includes a side pin 11 adjacent to its tip portion. The side pin 11 fits into an opening formed in the side of the wiper blade and is secured to the wiper arm 10 by means of a connector (side-pin type securing).

A different type of a connector is a multi-clip which couples the wiper blade with either the side pin 11 of the wiper arm 10 or the U-hook portion 12 of the wiper arm 10'. FIGS. 13 and 14 show examples of multi-clips.

In FIG. 13, a connector 100, for example, made of resin, includes side plates 101 and 102, and a main body portion 103 disposed between the side plates 101 and 102. An opening 104 is formed through the side plate 101, the main body portion 103 and the side plate 102. The opening 104 receives a pivot pin 9 of a wiper blade 1 so that the connector 100 is attached to the wiper blade 1. Openings 101A and 101B are also formed through the corresponding side plates 101 and 102 for receiving the side-pin 11.

The connector 100 further includes a main body 103 which has a forward portion 105 having an arcuate cross section. The U-hook portion 12 of the wiper arm 10' fits to the forward portion 105. The main body 103 is also provided at its rearward portion with an upper plate 106 and a lower plate 107 which are disposed substantially in parallel to each other. The lower plate 107 is resilient and is bendable downward.

The wiper blade 1 includes side portions 2B and 2C which include insertion openings 2D and 2E, respectively. To secure the side pin 11 of the wiper arm 10 to the connector 100, the side pin 11 is inserted into the opening 2D of the wiper blade 1. The side pin 11 passes through the opening 101A, the interval space between the upper and lower plates 106 and 107, and the opening 101A of the connector 100, so that a tip portion 11A of the side pin 11 reaches the insertion opening 2E of the wiper blade 1 to be disposed through the insertion opening 2E.

As shown in FIG. 13(c), the lower plate 107 is bended in a direction indicated by the arrow in the figure so that the interval space between the upper and lower plates 106 and 107 is enlarged to allow the tip portion 11A of the side pin 11 to pass through the interval space. As shown in FIG. 13(b), when the side pin 11 reaches the insertion opening 2E, a small-diameter portion 11B of the side pin 11 is positioned between the upper and lower plates 106 and 107. Thus, the lower plate 107 returns to the configuration in which the lower plate 107 is substantially parallel to the upper plate 106. As a result, the side pin 11 is held between the upper and lower plates 106 and 107.

FIG. 14 shows a connector 110. Similarly to the connector 100, the connector 110 includes side plates 111 and 112, and a main body 113. The connector 110 also includes an opening 114 for receiving the pivot pin 9 of the wiper blade 1 so that the connector 110 is rotatable about the pivot pin 9. The main body 113 includes a forward portion 113A which has an arcuate cross section to fit within the inside of the U-hook portion 12.

The connector 110 also includes a receiving portion 115 for receiving the side pin 11. To secure the side pin 11 to the connector 110, the side pin 11 is inserted into the wiper blade 1 and the side plates 111, 112. The connector 110 is the rotated in a direction shown by the arrow in FIG. 14(C). Thus, the small-diameter portion 11A of the side pin 11 is fit into the receiving portion 115 so that the connector 110 secures the side pin 11 to the wiper blade.

The foregoing conventional connectors have the following drawbacks. In the connector 100 of FIG. 13, the side plates 106 and 107 hold the small-diameter portion 11A of the side pin 11. Thus, the contact area between the connector 100 and the side pin 11 is not sufficiently large. Also, the side plates 106 and 107 are apt to spread from the configuration for holding the side pin 11, since the plates 106 and 107 are made of resin. Thus, the connector 100 cannot sufficiently prevent detaching of the side pin 11 from the wiper blade.

Also, the side pin 11 is connected to the underside of the rearward portion of the connector 100. Thus, an operator cannot check the connecting by sight. Also, such an operation is hard work to carry out by hand since the space under the connector 100 is not enough large to put the fingers of the operator into there.

In addition, the side pin 11 is attached to a position which is offset rearwardly from the center of the wiper blade 1 (near the pivot pin 9). Thus, when the wiper blade is connected to the wiper arm 10, the total length of the wiper blade and the wiper arm 10 becomes too long so that the wiper blade may contact to an automobile body.

In the connector 110 of FIG. 14, the contact area between the connector 110 and the wiper blade 1 is too small since the receiving portion 115 of the connector 110 is formed in the side plates 111 and 112. Thus, the connector 110 cannot sufficiently provide the suppression of vibrations between the wiper blade 1 and the wiper arm 10, and the abrasion resistance of the wiper blade 1 and the wiper arm 10.

Further, the side pin 11 is received within the receiving portion 115 which is formed by undercutting. Thus, if the receiving portion 115 is wear out by abrasion, the side pin 11 may be detached from the receiving portion 115.

SUMMARY OF THE INVENTION

To overcome the foregoing drawbacks, there is provided a connector for securing a wiper arm to a wiper blade comprising: a base member adapted to be attached to the wiper blade; a locking member; and a flexible connecting member for connecting said locking member to the base member, said wiper arm including a side pin, said base member including a portion for receiving said side pin, said locking member being operatively associated with said base member to hold said side pin received within said portion of said base member.

The base member may be configured to fit into a hook portion of a wiper arm of the hook type, the wiper blade being secured to the wiper arm of the hook type when the base member fits into the hook portion of the wiper arm.

The connector may further comprise side plates arranged to be held in surface contact with the wiper blade so as to restrict vibrations between the wiper blade and the wiper arm.

The wiper blade may include a pivot pin extending in a direction perpendicular to the longitudinal direction of the wiper blade, the base member having a joint portion adapted to be rotatably mounted to the pivot pin.

The portion of the base member may include an arcuate recess.

The locking member may be designed to move toward the recess, the locking member including a fitting portion designed to fit to at least one of the wiper blade and the base member.

The wiper blade may include a pivot pin for mounting the base member, the fitting portion designed to fit to the pivot pin.

The base member, the locking member and the connecting member may be formed as a one-piece member.

There is also provided a wiper blade assembly comprising the foregoing connector.

The wiper blade may comprise an opening formed on a side of the wiper blade, the opening configured to receiving the side pin of the wiper arm.

The wiper blade may further include a pivot pin extending in a direction perpendicular to the longitudinal direction of the wiper blade, the connector being mounted to the pivot pin, the connector designed to rotate about the pivot pin so that the portion of the base member receives the side pin.

The opening may be disposed on an opposite side of the wiper arm with respect to the pivot pin.

A connector and a wiper blade according to a feature of the present invention, the connector (for example, connector 20) includes a base member (for example, base member 21) mounted to the wiper blade (for example, wiper blade 1); a locking member (for example, locking member 22) operatively associated with the base member; and a flexible connecting member (for example, connecting member 23) connecting the base member with the locking member. The base member includes a portion (for example, a rearward upper portion 33 of the base member 21) for receiving a side pin 11 (for example, side pin 11) of a wiper arm (for example, wiper arm 10). The side pin 11 received within the portion of the base member is firmly held by the locking member so that the wiper blade is firmly secured to the wiper arm. In addition, an operator can easily attaches the locking member to the base member, since the connecting member connects the locking member to the base member so that the locking member may be freely moved with respect to the base member in the range of the deformation of the connecting member. Also, the flexible connecting member provide a simple structure for connecting the base member with the locking member than complex structures employed in the prior art. Thus, the cost is reduced.

A connector and a wiper blade according another feature of the present invention, the base member is configured to fit into a hook portion (for example, U-hook portion 12) of a wiper arm (for example, wiper arm 10'). Thus, a structure for securing a wiper blade to a wiper arm of the side pin type is combined with a structure for securing a wiper blade to a wiper arm of the hook type. In this case, the elements of the structure for securing a wiper blade to a wiper arm of the side pin type are mainly incorporated in the base member. Thus, the locking member includes few elements and may have a large contact area, such as side plates (for example, side plates 42 and 43), to surface-contact with the wiper blade. The contact between the locking member and the wiper blade decreases vibrations between the wiper blade and the wiper arm. The wear-out of the connector is also decreased.

A connector and a wiper blade according another feature of the present invention, the connector includes a joint portion (for example, recess 32B) which receives a pivot pin (for example, pivot pin 9) of the wiper blade. The connector is designed to move between the position for connecting the wiper blade with the hook portion and the position for connecting the wiper blade with the side pin so that the wiper blade is connected to a wiper arm at appropriate positions. In addition, the operator can visually confirm the operation when attaching the side pin to the connector.

A connector and a wiper blade according another feature of the present invention, the wiper blade includes an opening which receives the side pin. The insertion opening is disposed in an opposite side of the wiper arm with respect to the pivot pin. Thus, when a wiper arm of the side pin type is connected with the wiper blade, the overall length of the assembly of the wiper blade and the wiper arm is shortened so that the possibility of the contact between the wiper blade and a vehicle body is decreased.

A connector and a wiper blade according another feature of the present invention, the portion of the base member includes an arcuate recess (for example, recess 33A). The locking member is designed to move toward the recess. The locking member has fitting portion (for example, recesses 45 and 46) which fits to at least one of the wiper blade and the base member. The side pin is firmly held between the recess of the base member and the locking member. Also, combining the locking member to the base member is easily carried out since the locking member is connected to the base member through the flexible connecting member.

BRIEF DESCRIPTION OF THE DRAWINGS

FIG. 4(A) is a plan view of the connector. FIG. 4(B) is a bottom view of the connector.

FIG. 12(A) is a plan view of the side pin. FIG. 12(B) is a side view of the side pin. FIG. 12(C) is a plan view of a U-hook portion;

DETAILED DESCRIPTION OF THE INVENTION

Hereinafter, with reference to the accompanying drawings, an embodiment of the present invention will be described.

Figure 1:
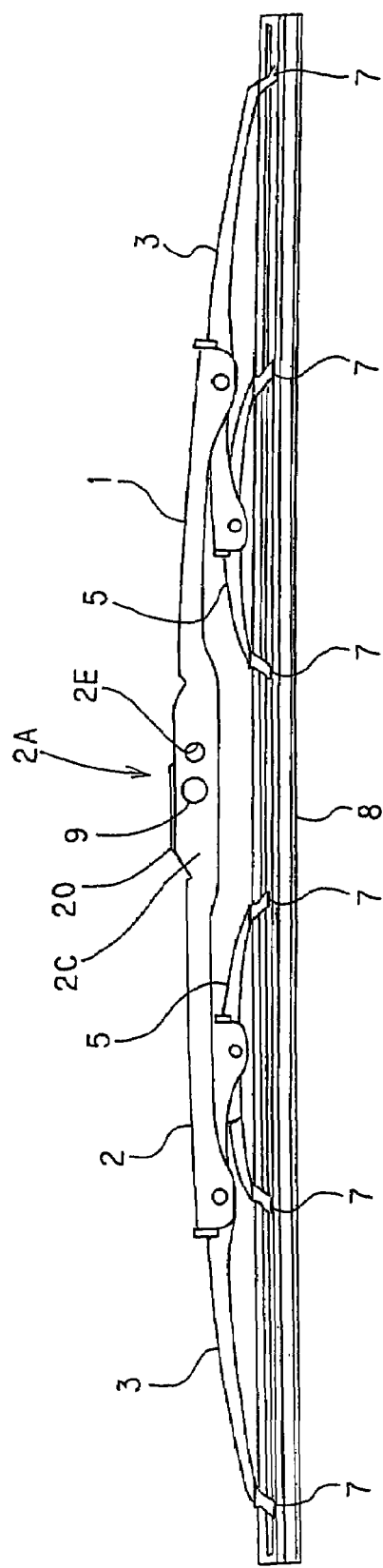
FIG. 1 is a front view showing the overall structure of a wiper blade assembly according to an embodiment of the present invention.
Figure 2:
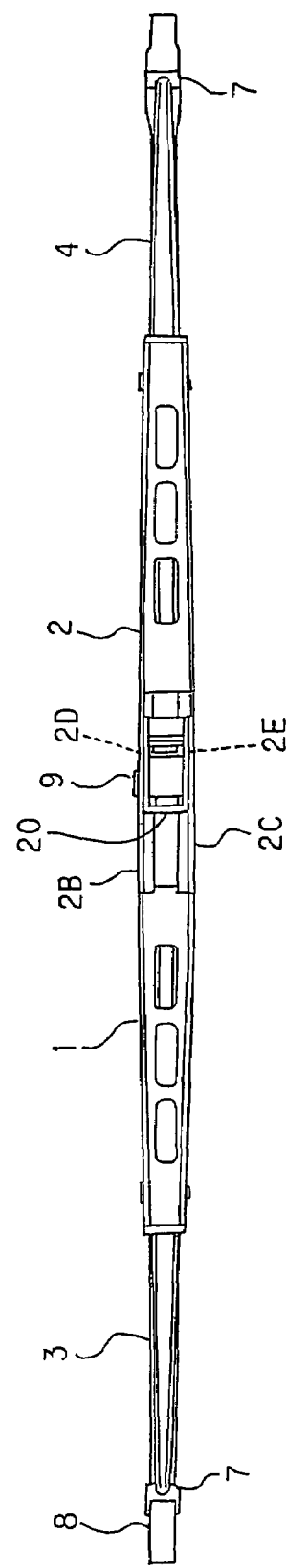
FIG. 2 is a plan view showing the overall structure of the wiper blade shown in FIG. 1.

FIGS. 1 and 2 show the overall structure of a wiper blade assembly. The wiper blade assembly includes the wiper blade 1 and a connector 20 for securing the wiper blade 1 to the wiper arm 10 (See FIG. 6).

The wiper blade 1 includes a primary lever 2. Secondary levers 3 and 4 are rotatably supported at the both ends of the primary lever 2. Yoke levers 5 and 6 are rotatably supported at the inside ends of the secondary levers 3 and 4. Supporting claws 7 are disposed at the outside ends of the secondary levers 3 and 4 and the both ends of the yoke levers 5 and 6. A wiper rubber 8 is supported by the supporting claw 7.

The primary lever 2 includes side plates 2B and 2C. An opening 2A is formed between the side plates 2B and 2C and is disposed at the substantially central portion of the primary lever 2. A pivot pin 9 is disposed at a substantially central portion of the wiper blade 1 and extends between the side plates 2B and 2C. A connector 20 is mounted on the pivot pin 9. Insertion openings 2D, 2E are formed through the side plate 2B, 2C and are located in the front side of the wiper blade (the left side of the wiper blade in the figure) with respect to the pivot pin 9. The side pin 11 is inserted into the insertion openings 2D and 2E.

The wiper arm 10 is coupled to the wiper blade 1 via the connector 20 and is also associated with a motor (not shown) through a link member (not shown). The wiper blade, the wiper arm 10, the link member and the motor constitute a wiper device. In the wiper device, the wiper blade is driven by the motor through the link member and the wiper arm 10 so as to move along a surface to be wiped, such as an automotive windshield. Thus, the surface is wiped by a wiper rubber 8.

Figure 3:
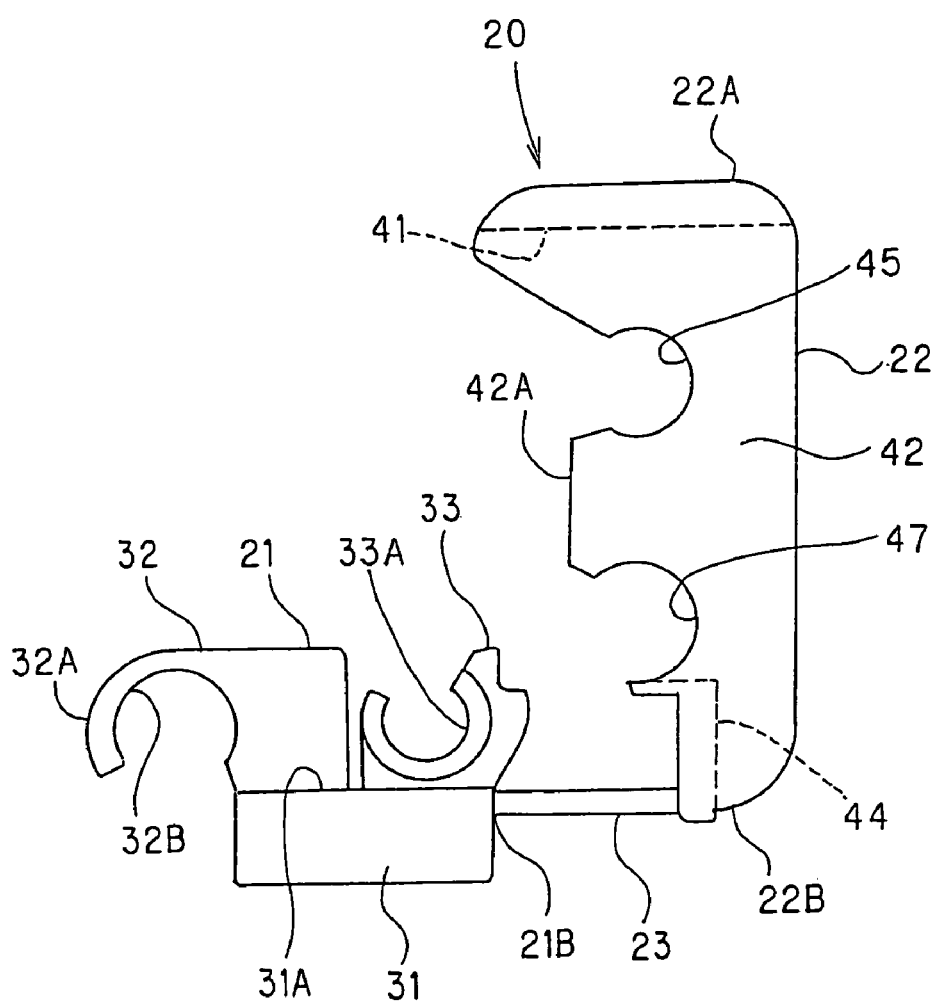
FIG. 3 is a front view showing a connector.
Figure 4A:
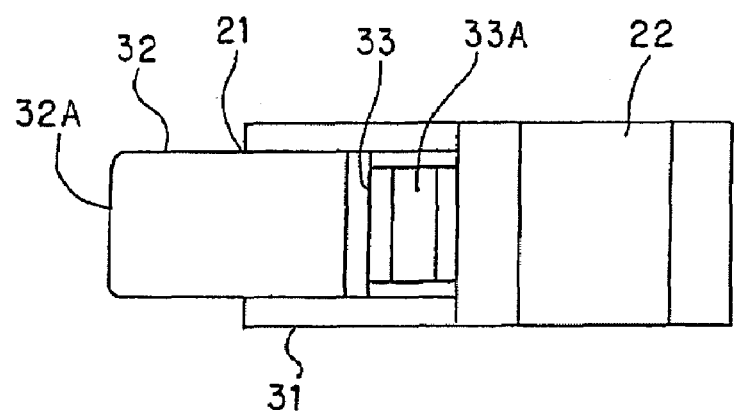
FIGS. 4(A) and 4(B) are views showing the connector shown in FIG. 3.
Figure 4B:
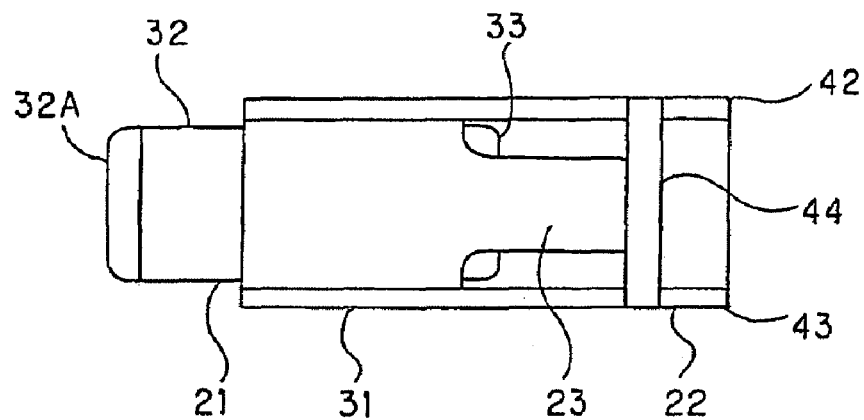
Figure 5A:
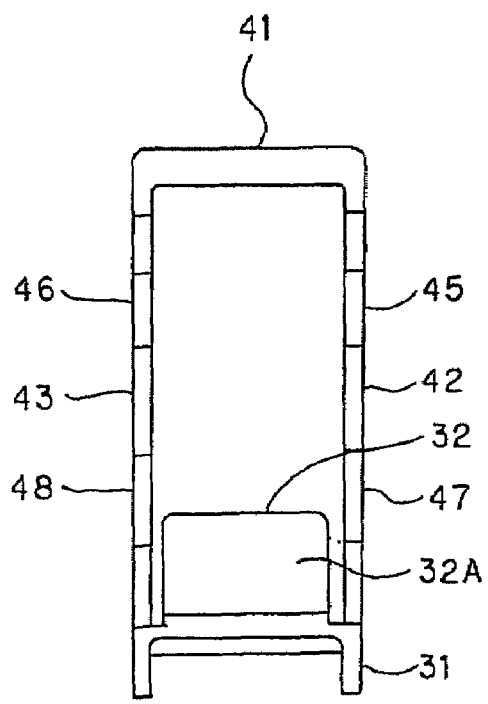
FIG. 5(A) is a left side view of the connector.
Figure 5B:
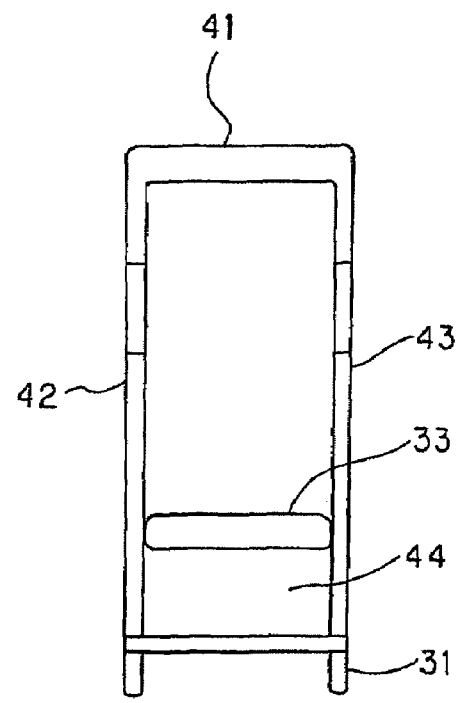
FIG. 5(B) is a right side view of the connector.

FIGS. 3 to 5 show the connector 20 in unmounted status. FIG. 3 shows a side view of the connector 20. FIGS. 4(A) and 4(B) show a plan view and a bottom view of the connector 20, respectively. FIGS. 5(A) and 5(B) show a front view and a rear view of the connector 20, respectively.

As shown, the connector 20 includes a base member 21; a locking member 22 which holds the U-hook portion 12 of the wiper arm 10' between the base member 21 and the locking member 22; and a connecting member 23 connecting the locking member 22 to the base member 21. The base member 21, the locking member 22 and the connecting member 23 are formed as a one-piece member, for example, by molding of plastic.

The base member 21 includes a base portion 31, a forward upper portion 32, and a rearward upper portion 33. The forward upper portion 32 extends forwardly from the upper side of the base portion 31. The forward upper portion 32 includes a front end portion 32A formed in the shape of the circular figure corresponding to the figure of the U-hook portion 12 of the wiper arm 10' so that the forward upper portion 32 fits within the U-hook portion 12.

The forward upper portion 32 also includes a recess 32B formed in the under side of the end portion 32A. The recess 32B has a circular cross section and extends in a direction perpendicular to the longitudinal direction of the base member 21. The pivot pin 9 of the wiper blade 1 fits into the recess 32B so that the connector 20 is mounted on the pivot pin 9 and is rotatable about the pivot pin 9.

The rearward upper portion 33 includes a recess 33A which opens upward. The recess 33A has a circular cross section and extends in a direction perpendicular to the longitudinal direction of the base member 21. The side pin 11 of the wiper arm 10 is inserted into the recess 33A.

The locking member 22 has a case-like shape so as to fit on the upper side of the base member 21 in order to secure the side pin or the U hook portion 12. The locking member 22 includes a front transverse plate 41 disposed at a front end 22A of the locking member 22; side plates 42 and 43 disposed on both sides of the locking member 22; and a rear transverse plate 44 disposed in the vicinity of the rear end 22B. Each of the side plates 42 and 43 has a wide portion near the front end 22A of the locking member 22. The front transverse plate 41 is disposed between the wide portions of the side plates 42 and 43 and extends in a direction perpendicular to the longitudinal direction of the base member 21. The rear transverse plate 44 is disposed between the rear end portions of the side plates 42 and 43 and extends in the longitudinal direction of the locking member 22.

Each of the side plates 42 and 43 includes recesses 45 and 46 for fitting to the pivot pin 9, and recesses 47 and 48 for holding the side pin 11, respectively. Each of the recesses 45 and 46 has a circular bottom portion to receive the pivot pin 9 and is arranged in the position corresponding to the position of the recess 32B of the base member 21. Each of the recesses 47 and 48 has a circular shape to receive the side pin 11 and is arranged in the position corresponding to the position of the recess 33A of the base member 21.

When the wiper blade 1 is secured via the connector 10 on the side pin 11 of the wiper arm 10 or the U-hook portion 12 of the wiper arm 10', the side plates 42 and 43 are disposed so that the forward upper portion 32 and the rearward upper portion 33 of the base member 21 are pinched between the side plates 42 and 43. Lower ends 42A and 43A of the side plates 42 and 43 are positioned to engage with the upper end 31A of the base portion 31. A front end 44A of the rear transverse plate 44 is positioned to engage with the rearward upper portion 33. The base member 21 is aligned with the locking member 22 in the longitudinal direction. Thus, the recess 32B of the forward upper portion 32 are aligned with the recesses 45 and 47 of the side plate 42 and 43, and the recess 33A of the rearward upper portion 33 are aligned with the recesses 47 and 48 of the side plate 42 and 43.

The front transverse plate 41 is spaced from the front end 32A by a distance which corresponds to the thickness of U-hook portion 12. Thus, the U-hook portion 12 is firmly held between the front transverse plate 41 and the front end 32A.

When the locking member 22 is mounted on the base member 21, the recesses 47 and 48 of the locking member 22 fit to the side pin 11 mounted to the recess 33A of the base member 21. Thus, the side pin 11 is firmly held within the recess 33A of the rearward upper portion 33 of the base member 21.

The connecting member 23 has a plate-like shape and connects the rear end portion 21B of the base member 21 to the rear end portion 22B of the locking member 22. The connecting member 23 is flexible and is bendable toward any direction. Thus, the locking member 22 is movable with respect to the base member 21 within a range allowed by the flexibility of the connecting member 23.

Specifically, when the connector 20 is not used for connecting the wiper blade 1 to the wiper arm 10 or 10', the base member 21 and the looking member 22 has an angle of substantially 90 degrees between them, as shown in FIGS. 3 to 5. To connect the wiper blade 1 to the wiper arm 10 or 10', the base member 21 and the lacking member 22 are aligned to be overlapped in the longitudinal directions thereof (See FIG. 6(D)).

FIGS. 7 to 11 show the procedure to secure the wiper blade 1 to the side pin 11 of the wiper arm 10 by means of the connector 20.

Figure 6A:
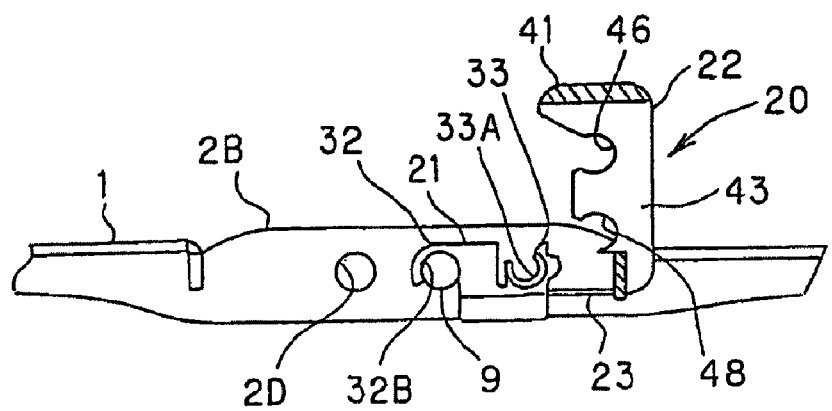
FIG. 6 is a view illustrating a procedure for securing a wiper arm to the wiper blade through the connector.
Figure 7:
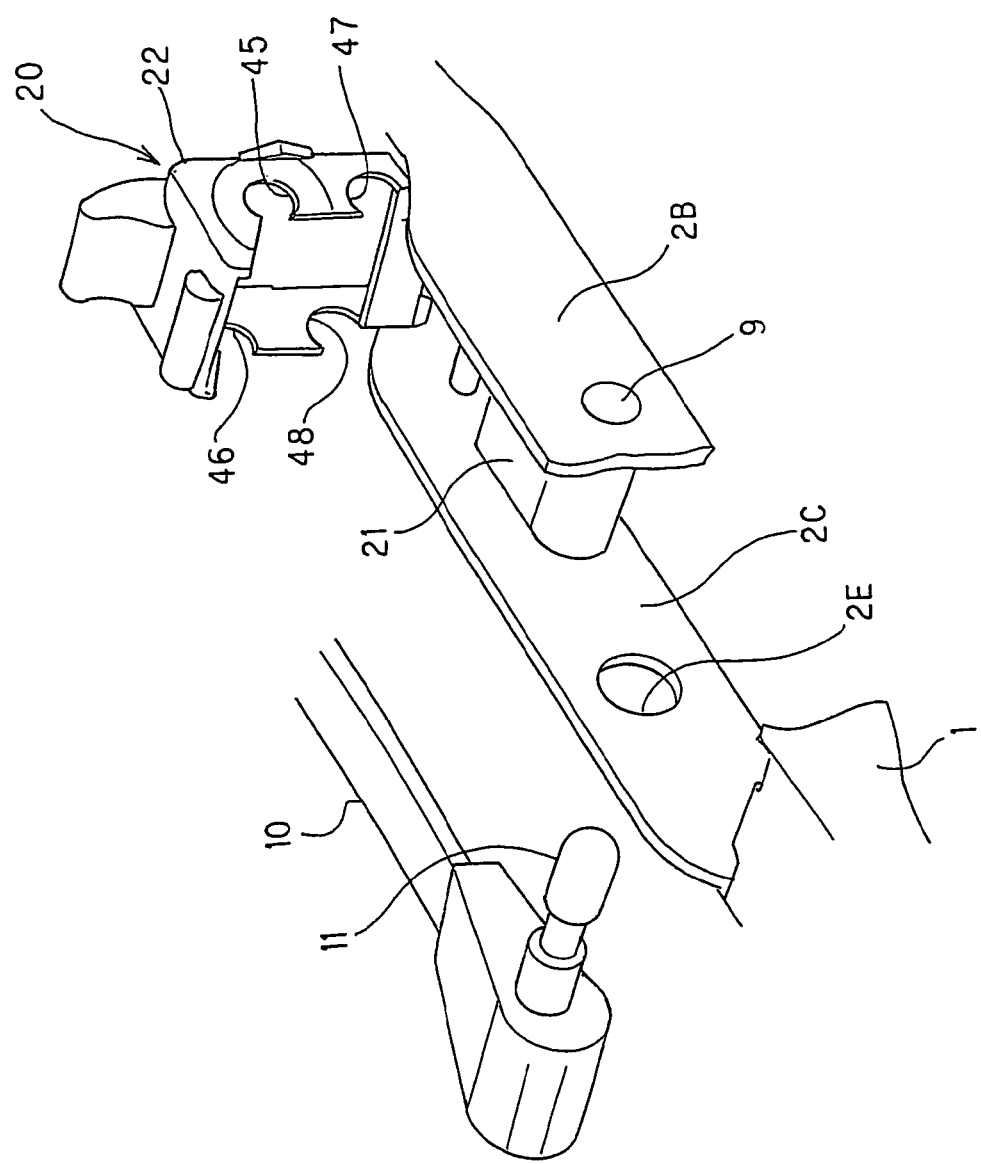
FIG. 7 is a perspective view showing a step of securing the wiper arm with the wiper blade by means of the connector.
Figure 8:
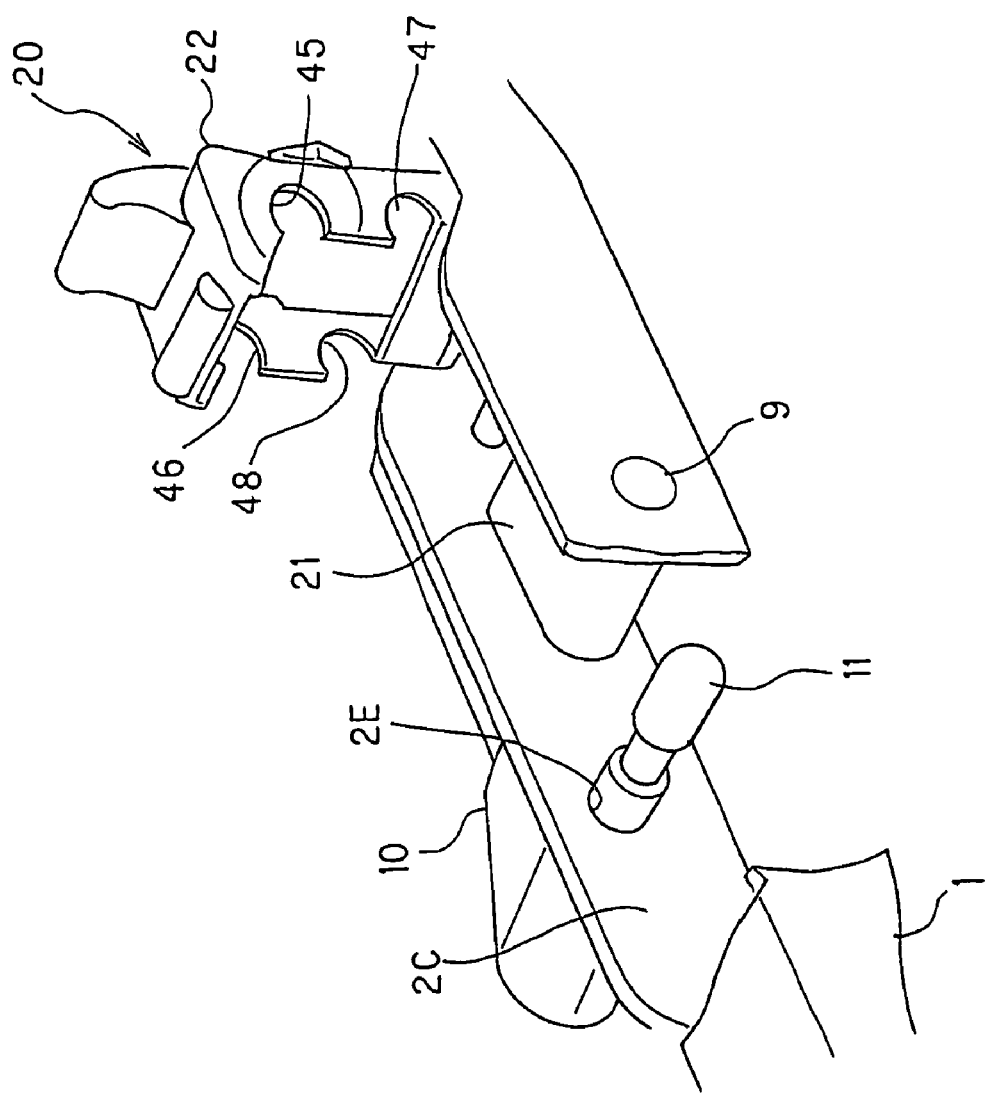
FIG. 8 is a perspective view showing a step of securing the wiper arm with the wiper blade by means of the connector.

As shown in FIGS. 6(A) and 7, the pivot pin 9 of the wiper blade 1 is mounted within the recess 32B of the base member 21. The locking member 22 is positioned in the rear side (in the right side in the figure) with respect to the pivot pin 9 (or the center of the wiper blade 1). The connector 20 is generally positioned in the opposite side of the insertion openings 2D and 2E of the wiper blade 1 so that the side pin 11 is inserted into the insertion openings 2D and 2E, as shown in FIG. 8.

The wiper blade 1 is attachable to the U-hook portion 12 of the wiper arm 10 by means of the connector 10 positioned in rear side of the wiper blade 1 with respect to the pivot pin 9 as shown in FIG. 6(A). The forward upper portion 33 of the mounting portion 21 disposed in such a position fits within the U-hook portion 12 so that the wiper arm 10 extends backward from the center of the wiper blade 1.

Figure 6B:
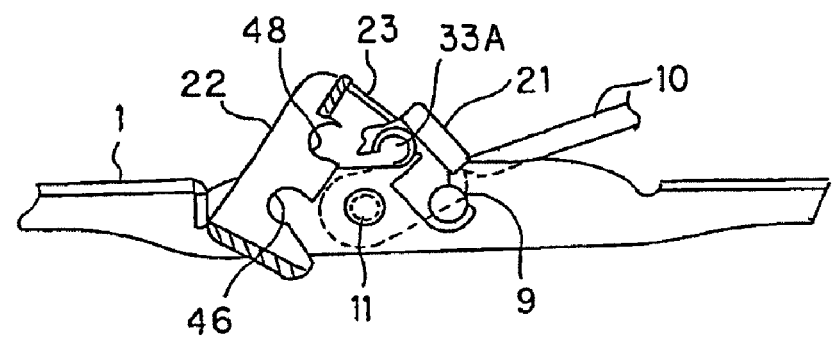
Figure 6C:
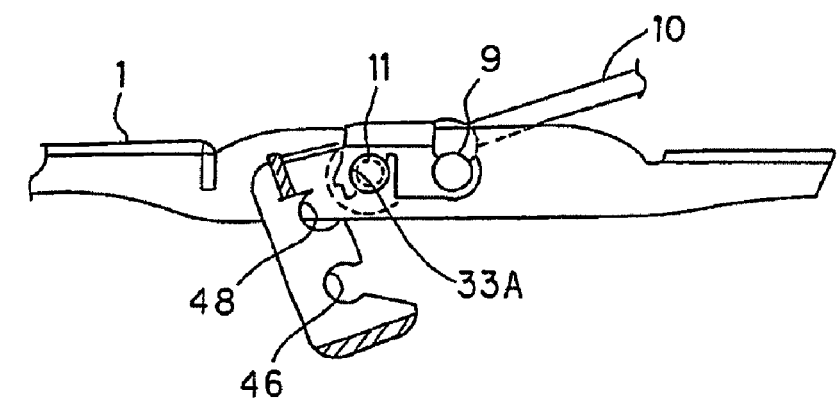
Figure 9:
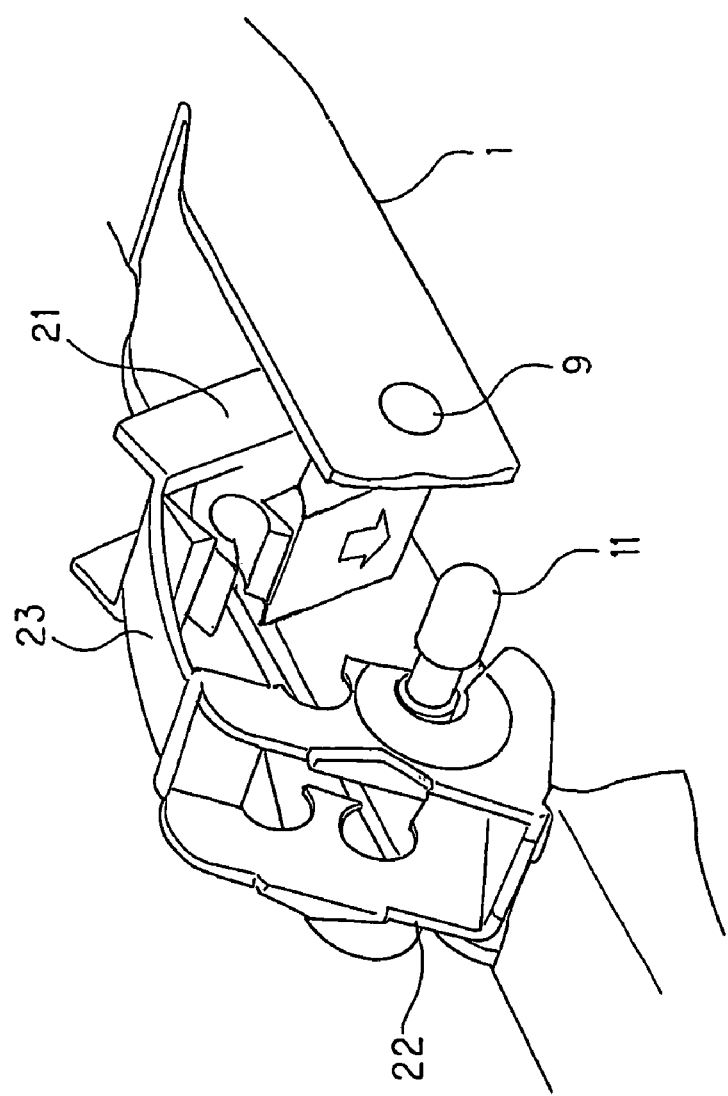
FIG. 9 is a perspective view showing a step of securing the wiper arm with the wiper blade by means of the connector.
Figure 10:
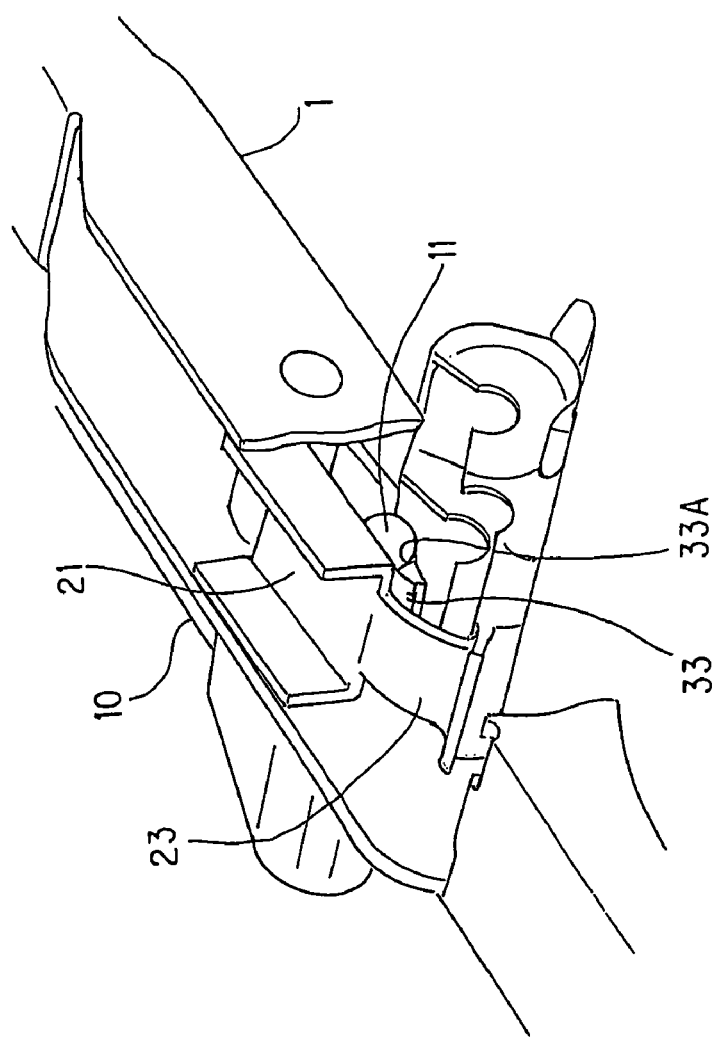
FIG. 10 is a perspective view showing a step of securing the wiper arm with the wiper blade by means of the connector.

As shown in FIGS. 6(B) and 9, the connector 20 is rotated about the pivot pin 9 toward the side pin 11 from the opposite side of the side pin 11. As shown in FIGS. 6(C) and 10, when the connector is rotated by substantially 180 degrees, the side pin 11 fits into the recess 34A of the forward upper portion 33 of the base member 21.

Figure 6D:
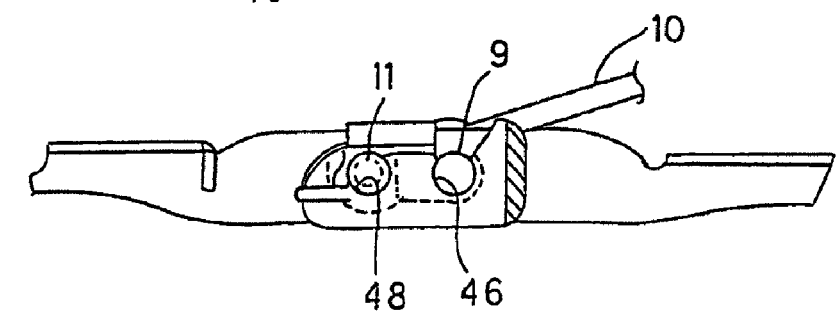
Figure 11:
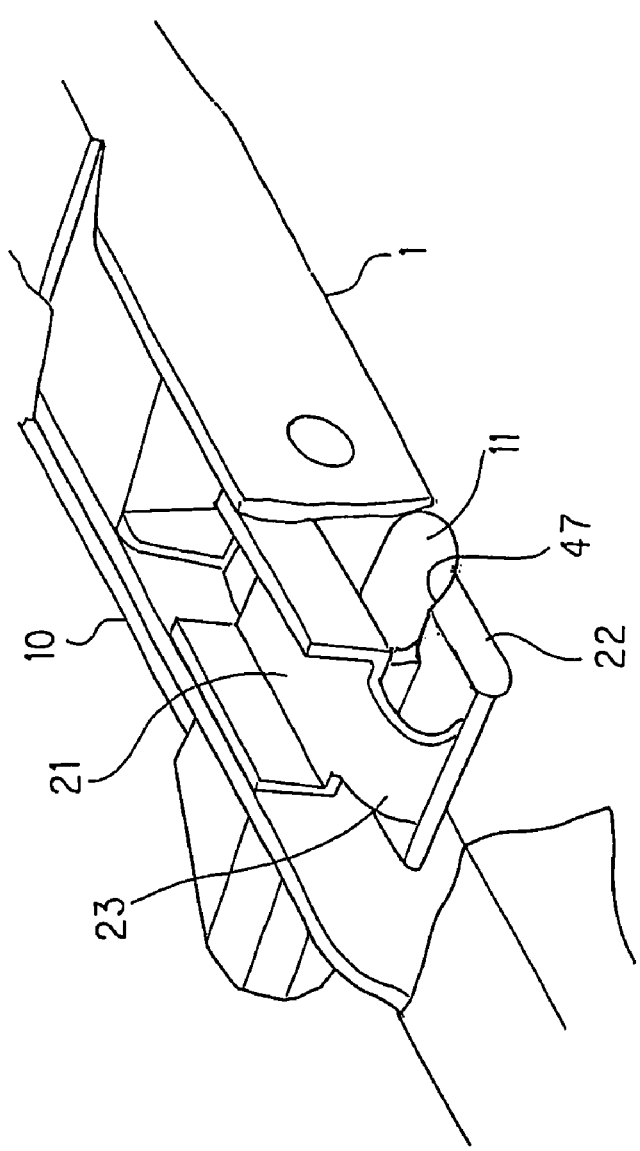
FIG. 11 is a perspective view showing a step of securing the wiper arm with the wiper blade by means of the connector.
Figure 12A:
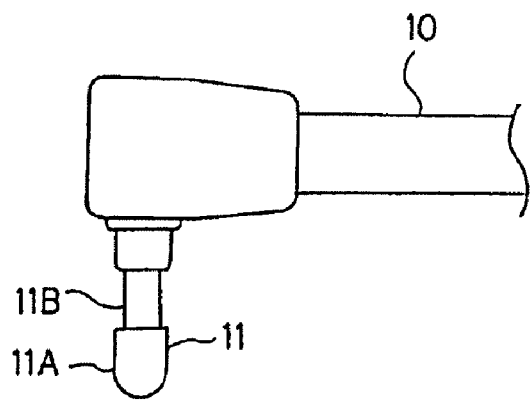
FIGS. 12(A), 12(B) and 12(C) are views showing the securing structure of the wiper arm.
Figure 12B:
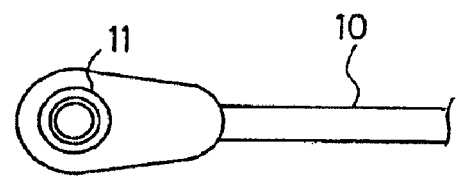
Figure 12C:
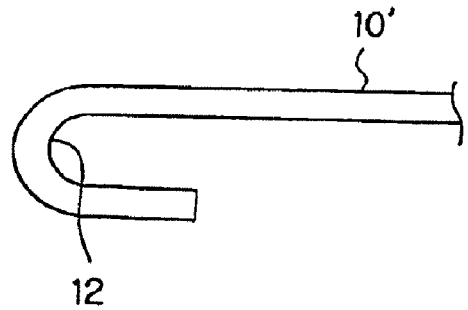
Figure 13A:
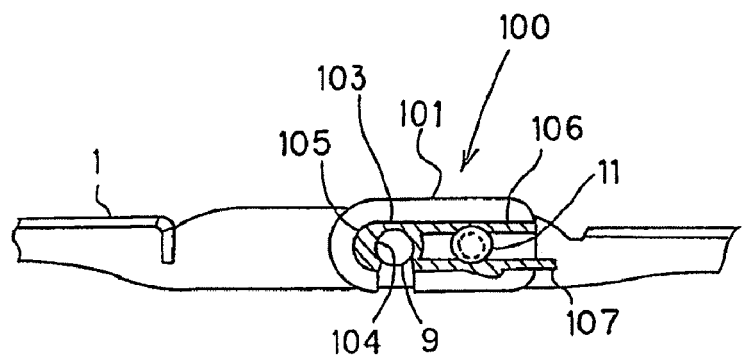
FIG. 13 is a view for explaining the connection of a wiper blade with a wiper arm using a conventional connector.
Figure 13B:
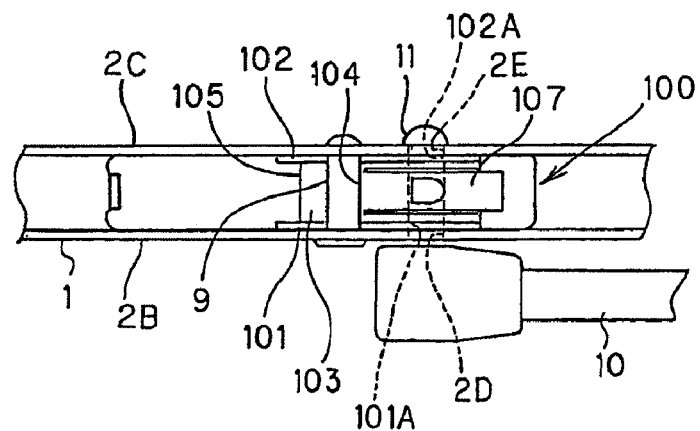
Figure 13C:
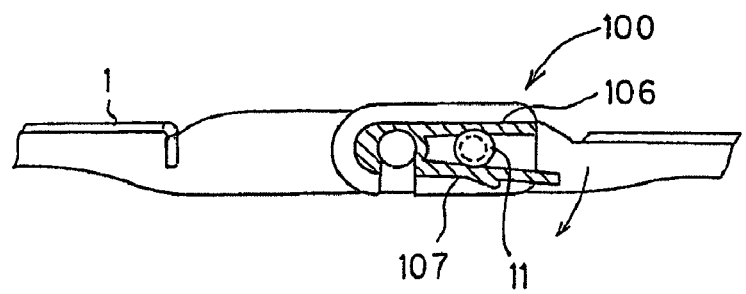
Figure 14A:
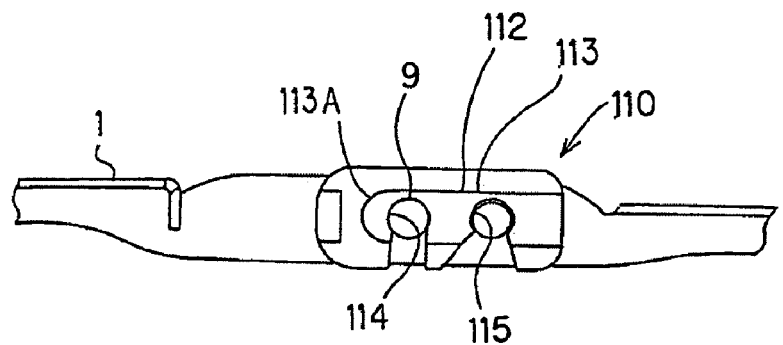
FIG. 14 is a view for explaining the connection of a wiper blade with a wiper arm using another conventional connector.
Figure 14B:
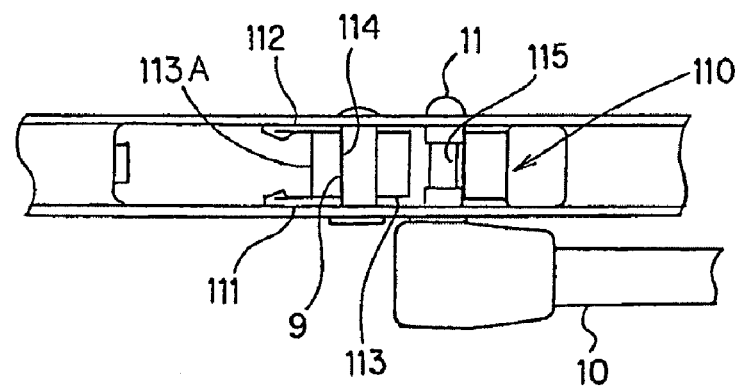
Figure 14C:
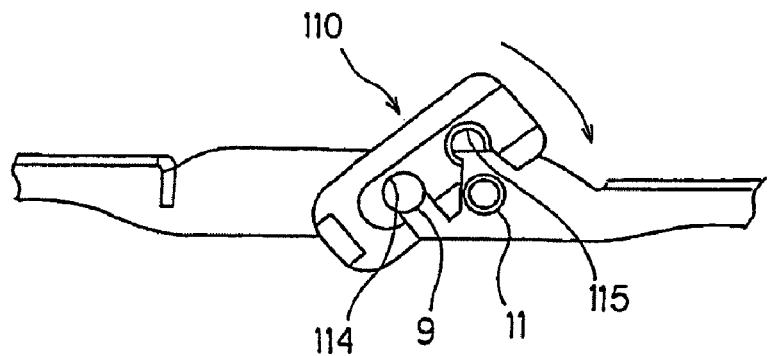

As shown in FIGS. 6(D) and 11, the locking member 22 is moved to be combined with the base member 21. The pivot pin 9 fits into the recesses 45 and 46 of the locking member 22, and the side pin 11 received within the recess 33A of the forward upper portion 33 fits into the recesses 47 and 48 of the locking member 22. As a result, the locking member 22 is secured to the side pin 11 and the base member 21, and faces toward the recess 33A so as to hold the side pin 11. Accordingly, the side pin 11 is firmly held between the base member 21 and the locking member 22 so that the wiper blade 1 is firmly coupled to the wiper arm 10 through the connector 20.

As is described above, according to the connector 20 of the embodiment, since the side pin 11 of the wiper arm 10 is held by the recess 33A of the rearward upper portion 33 of the base member 21, the recesses 47, 48 of the locking member 22 for holding the side pin 11 received within the recess 33A is allowed to be formed to have relatively small dimensions. Therefore, the side plates 42 and 43 of the locking member 22 may be arranged to have a large area to contact with the side plates 2B and 2C of the wiper blade 1 so that vibrations between the wiper blade 1 and the wiper arm 10 or 11. This decreases the wear-out of the connector 20.

With the connector 20, the side pin 11 is firmly held since the side pin 11 is doubly held by the recess 33A of the base member 21 and the recesses 47 and 48 of the locking member 22.

An operation to fit the locking member 22 to the base member 21 is easy since the locking member 22 is connected to the base member 21 through the flexible connecting member 23.

The connector 20 is rotatable about the pivot pin 9 by 180 degrees so as to be positioned for connecting to one of the U-hook portion 12 and the side pin 11. To couple the U-hook portion 12 to the wiper blade 1, the connector 20 is generally positioned in the rear side of the wiper blade 1 with respect to the pivot pin 9 so that the wiper arm 10' is secured to the forward upper portion 32 of the base member 21. To couple the side pin 11 to the wiper blade 1, the connector 20 is rotated to a position in the front side of the wiper blade 1 with respect to the pivot pin 9 so that the side pin 11 is secured to the connector 20. The total length of the assembly of the wiper blade and the wiper arm 10 is relatively shortened so that the engagement between the wiper blade and a vehicle body is prevented.

To secure the side pin 11 to the connector 20, an operator rotates the connector 20 positioned toward the side pin 11 inserted into the insertion openings 2E and 2D of the wiper blade 1 from the opposite side of the side pin 11 so that the side pin 11 fits into the recess 33A of the forward upper portion 33, and the locking member 22 fits to the base member 21. Thus, the operation to attach the side pin 11 to the connector 20 is easily carried out. Also, the operator can visually confirm the operating position.

The invention claimed is:

1. A connector for detachably securing a wiper blade to a wiper arm including a side pin, said connector comprising:
   a base member adapted to be attached to the wiper blade, said base member including a receiving portion for receiving the side pin of the wiper arm;
   a locking member; and
   a flexible connecting member for connecting said locking member to said base member,
   said locking member being operatively associated with said base member to hold the side pin when received within said receiving portion of said base member, and
   said receiving portion of said base member comprising an arcuate recess and said locking member having part-circular recesses, wherein said arcuate recess of said base member is adapted to receive the side pin and said part-circular recesses of said locking member are adapted to hold the side pin in said arcuate recess of said base member, and
   wherein the wiper blade includes a pivot pin extending in a direction perpendicular to the longitudinal direction of the wiper blade, the base member having a joint portion adapted to be rotatably mounted to the pivot pin.

2. The connector according to claim 1 wherein the base member is configured to fit into a hook portion of a wiper arm of the hook type, the wiper blade being secured to the wiper arm of the hook type when the base member fits into the hook portion of the wiper arm.

3. The connector according to claim 2 wherein the locking member further comprises side plates arranged to be held in surface contact with the wiper blade so as to restrict vibrations between the wiper blade and the wiper arm.

4. The connector according to claim 1 wherein the locking member is designed to move toward the arcuate recess of the base member, the locking member including a portion designed to be fittingly attached to at least one of the wiper blade and the base member.

5. The connector according to claim 4 wherein the wiper blade includes a pivot pin for mounting the base member, said portion of the locking member designed to fit to the pivot pin.

6. The connector according to claim 1 wherein the base member, the locking member and the flexible connecting member are formed as a one-piece member.

7. A wiper blade assembly comprising the connector according to claim 1.

8. A wiper blade assembly comprising a wiper arm having a side pin, a wiper blade having an opening through which said side pin is received, and a connector rotatably mounted on said wiper blade for connecting said wiper blade to said wiper arm, said connector comprising:
   a base member including a receiving portion for receiving said side pin of said wiper arm;
   a locking member; and
   a flexible connecting member connecting said locking member to said base member, said locking member being operatively associated with said base member to hold said side pin when received within said receiving portion of said base member, and said receiving portion of said base member comprising an arcuate recess and said locking member having part-circular recesses, wherein said arcuate recess of said base member is adapted to receive said side pin and said part-circular recesses of said locking member are adapted to hold said side pin in said arcuate recess of said base member, wherein the opening is formed in a side of the wiper blade.

9. The wiper blade assembly according to claim 8 wherein the wiper blade further includes a pivot pin extending in a direction perpendicular to the longitudinal direction of the wiper blade, the connector being rotatably mounted to the pivot pin so that said arcuate portion of said base member receives the side pin.

10. The wiper blade assembly according to claim 9 wherein said opening is disposed on the side of the wiper blade that opposes a side of the wiper arm having the side pin.

* * * * *